Patented Jan. 22, 1952

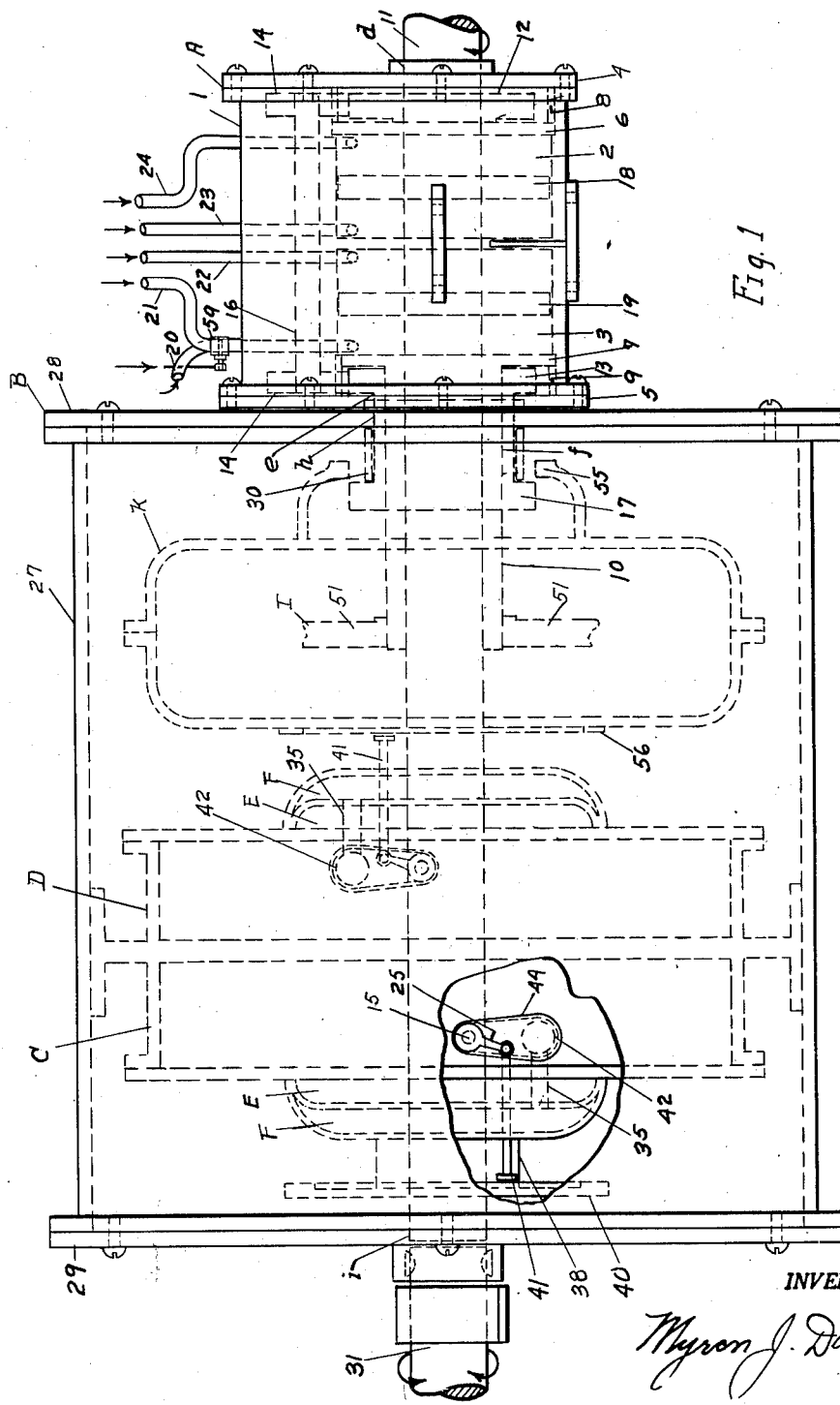

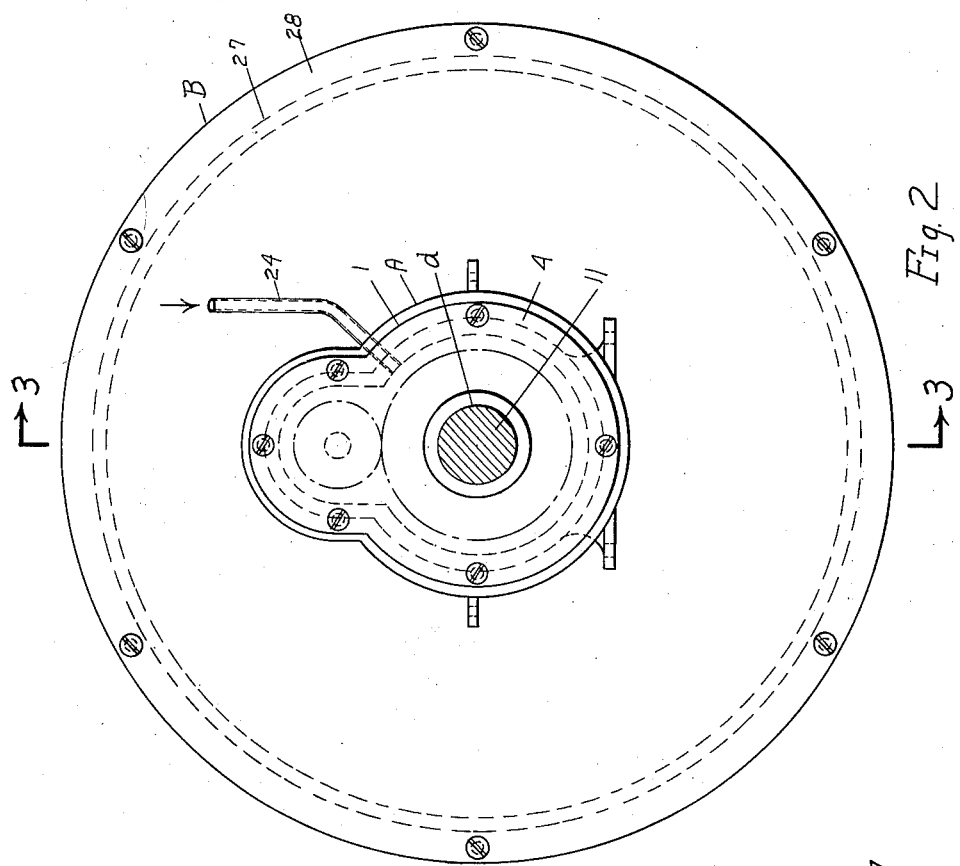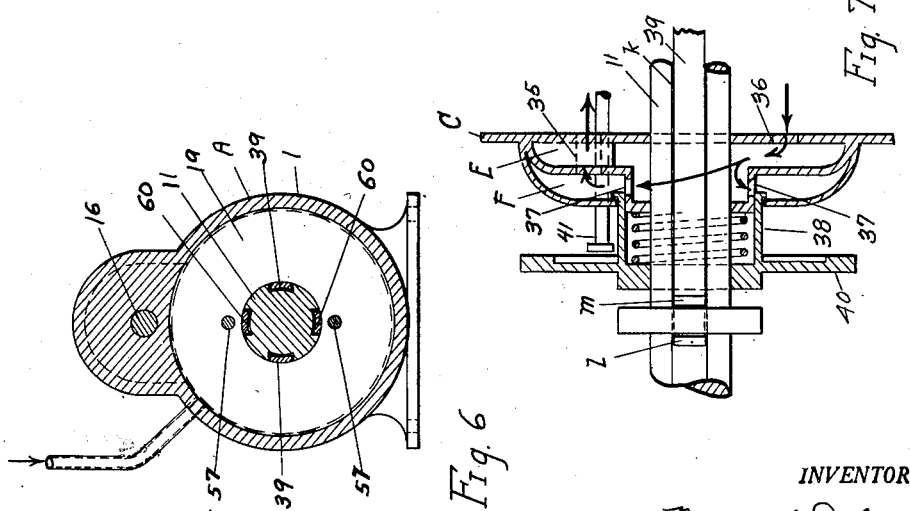

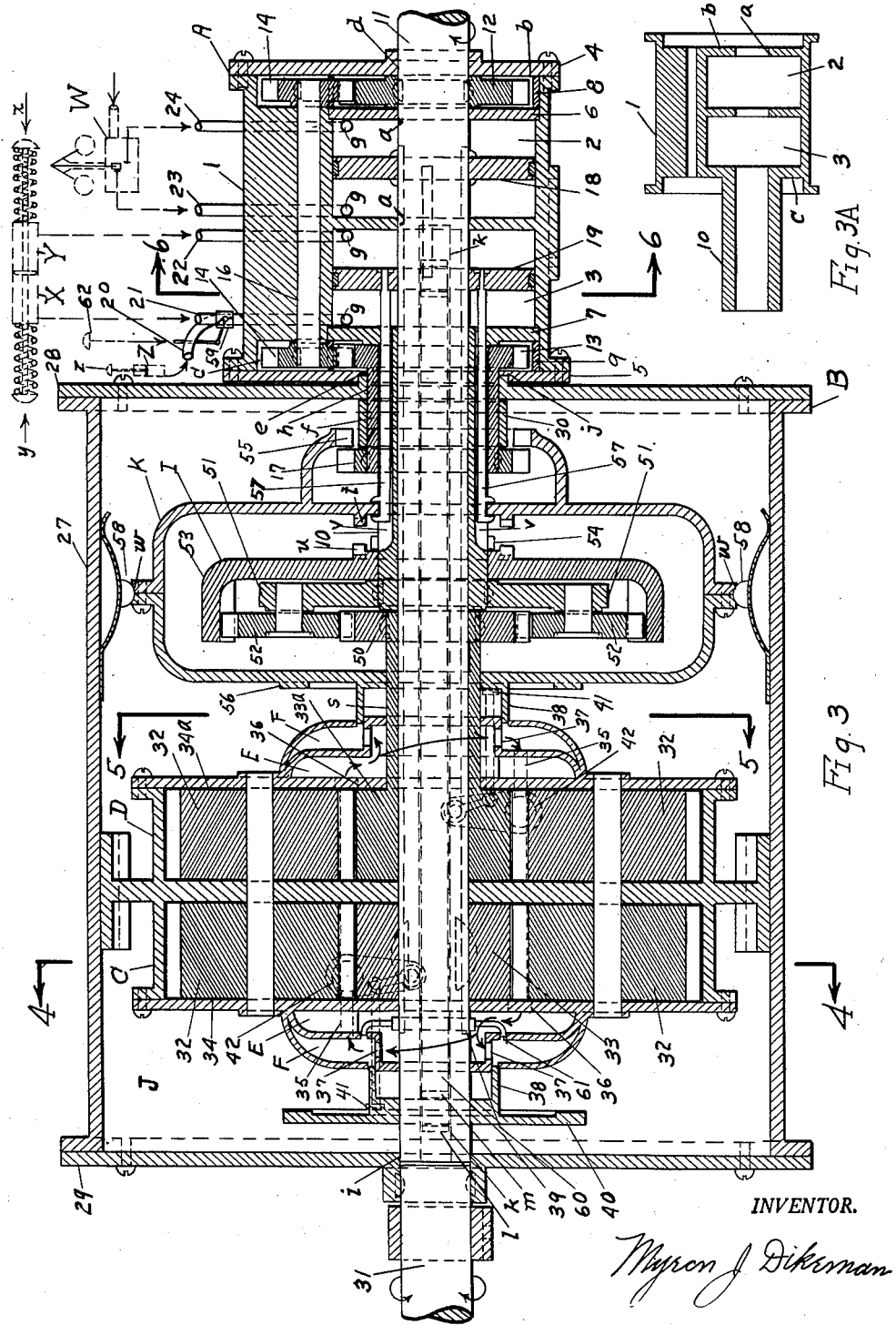

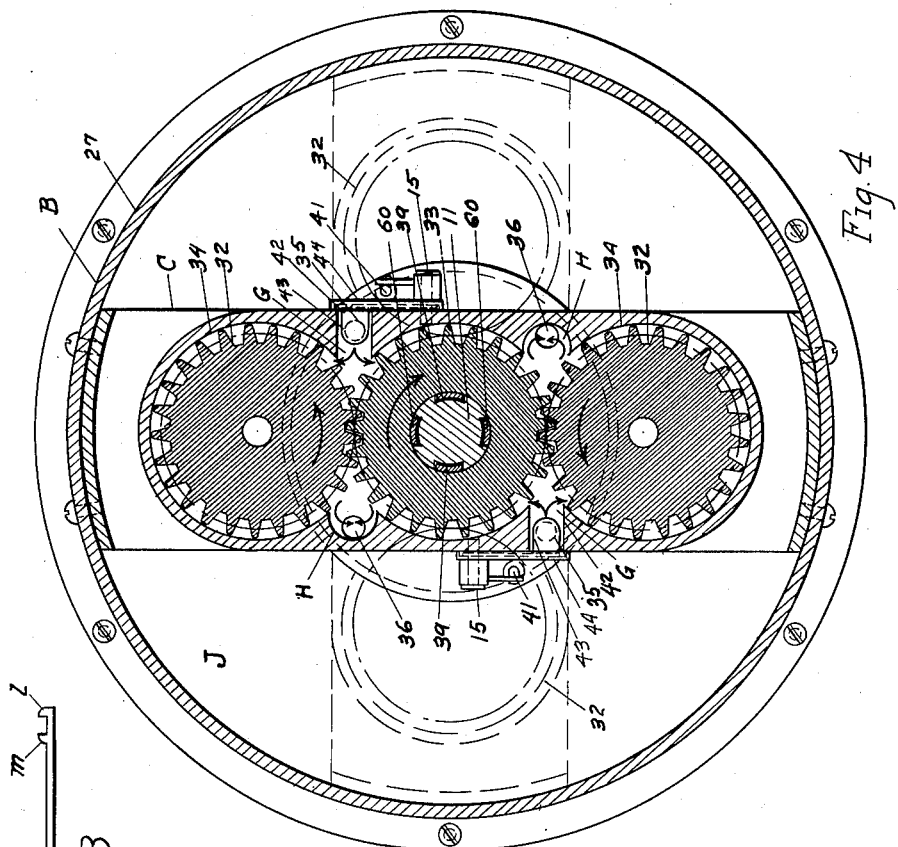

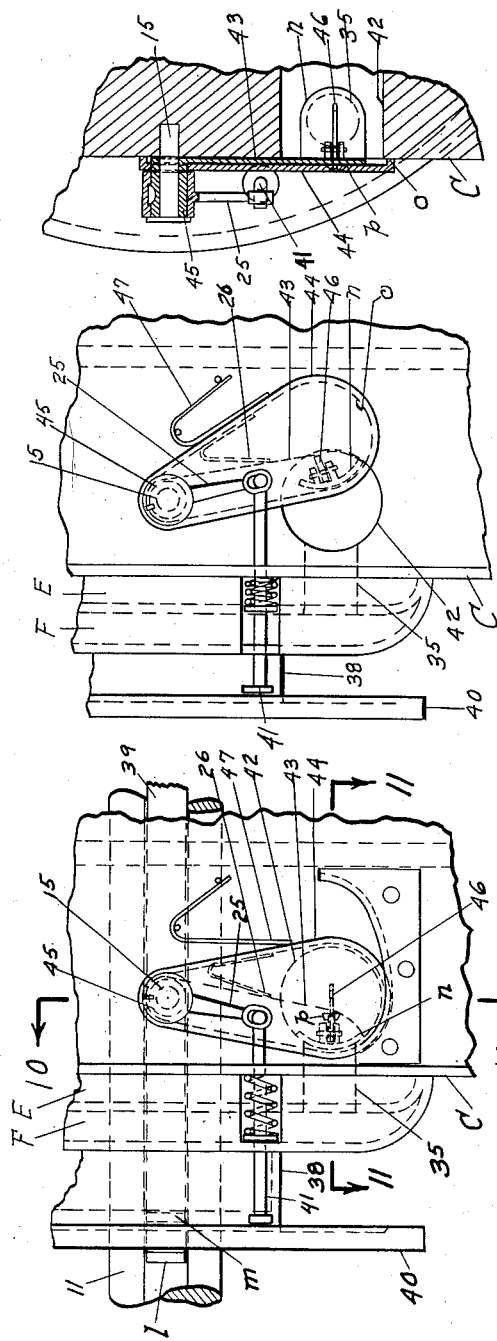

2,583,209

UNITED STATES PATENT OFFICE 2,583,209

HYDRAULIC AUTOMATIC DRIVE AND CONTROL

Myron J. Dikeman, Grosse Pointe Woods, Mich.

Application February 27, 1951, Serial No. 212,907

9 Claims. (Cl. 74—718)

1

The object of my invention is to produce a hydraulic drive and control unit for the complete operation of an automobile without any exterior mechanical operating means.

Another object is to provide a full hydraulic automatic drive control that will completely replace both the automobile clutch and transmission sections, and that will produce similar torque multiplication, and without overheating, or energy loss.

A further object is to provide a hydraulic drive control that may be either manually or automatically operated for controlling varying load conditions.

A still further object is to produce a special hydraulic bearing control head applicable to various forms and types of fluid drive and control units, for full control thereof.

These several objects are attained in the preferred form by the construction and arrangement of parts as more fully hereinafter set forth.

Similar parts on all drawings are marked by similar numerals or letters.

Fig. 1 is a side elevation of the hydraulic drive and control unit, showing the exterior assembly, with mountings, and the general arrangement of the interior operating sections.

Fig. 2 is an end elevation of the assembled device, showing the relative position of the exterior sections, and pipes connections, when mounted on a common drive shaft.

Fig. 3 is a vertical sectional view taken on the line 3—3 of the Fig. 2, showing the general arrangement of the operating parts.

Fig. 3A is a restricted sectional view also through the hydraulic bearing casing, the same as Fig. 3, but illustrating the casing as of a rigid construction resulting from the parts assembly when all are rigidly bolted together. A rigid casing.

Fig. 3B is a detail side elevation of a typical shaft operating slide bar, illustrating the rigid end operating ribs, and means for free rotation of the engaging collar and bearing sections to be rotatably mounted therein.

Fig. 4 is a cross-sectional view taken on the line 4—4 of the Fig. 3, showing the relative position of the respective fluid control unit gears and ports.

Fig. 5 is also a cross-sectional view taken on the line 5—5 of the same Fig. 3, showing the relative position of the dual outlet and return chambers, and the port chamber fluid flow.

Fig. 6 is a cross-sectional view taken on the line 6—6 of the Fig. 3, showing the hydraulic control chambers and pistons.

2

Fig. 7 is a modified cross-sectional view of a substitute outlet port valve, especially designed with spring valve control.

Fig. 8 is an enlarged elevation view of the dual inlet port valve, showing both valves in their closed positions.

Fig. 9 is the same side elevation view of the dual port valves in the Fig. 8, but illustrating both valves in their extreme open positions, just prior to tripping and closing of outer valve.

Fig. 10 is a vertical sectional view taken on line 10—10 of the Fig. 8, showing the detail dual valve construction and the relative position of the adjacent inlet fluid ports.

Fig. 11 is a horizontal sectional view taken on the line 11—11 of the Fig. 8, showing the outer valve trip ratchet for operating the dual sections jointly and separately.

Fig. 12 is a cross-sectional view through the valve operating hub, illustrating a fixed key attachment, and without valve locking means.

Fig. 13 is a modified cross-sectional view through the same operating hub, but illustrating an adjustable key hub attachment, and with special valve locking and release mechanism.

This new hydraulic drive control assembly is related to my universal fluid drive and control unit referred to in Reissue Patent 23,342, dated February 20, 1951, and does again utilize some of the old elements, and sections, yet in a different assembly within a new structural combination adaptable to hydraulic operating mechanism not possible in the former invention, and with the elimination of all exterior mechanical operating parts, the new assembly now being under complete hydraulic operation and control, for all operations, either automatically or mechanically, or at the will of the operator. While some of the old units, or sections, as are reassembled for this new structural combination are old, yet no new claim, or claims are again made to any of the old units, or sections, per se.

The new hydraulic drive and control comprises, generally, a fixedly mounted hydraulic bearing control, and a rotatable fluid drive section, joined together by a common drive shaft with intervening back-gearing and hydraulic control mechanism common to both sections, all sychronized for unison operation. The hydraulic bearing control is formed with an elongated, fluid filled, chambered bearing casing for rotatably mounting a drive shaft therethrough, and is designed with special internal, shaft back-gearing, and dual hydraulic piston control cylinders, both surrounding, and concentric with the said drive shaft, and with the respective pistons operatively mounted thereon, designed for special attached hydraulic operating mechanism. The fluid drive section is formed of a closed, cylindrical, fluid filled drive casing, designed for rotatably mounting over the common drive shaft, and within a sealed bearing within the bearing control. The drive unit is provided with dual, drive and reverse, gear fluid control units, positioned centrally therein, back to back, both operatively connected to the drive shaft, and controlled by hydraulic operating mechanism and intervening back-gearing from the adjoining hydraulic bearing control.

I will now describe more fully the detail construction of my device, referring to the drawings and the marks thereon.

The hydraulic bearing control A is formed of an elongated chambered bearing casing 1 for fixedly mounting on a suitable rigid support, as an automobile frame cross member, and is formed with a drive shaft bearing a lengthwise therethrough, and designed with enlarged, central, dual hydraulic cylinder chambers 2 and 3 concentric with the drive shaft bearing axis, and with back-gear recess chambers b and c at opposite casing ends. Suitable head plates 4 and 5 are fixedly mounted over the respective end gear recesses, and are formed with a central drive shaft bearing d through the outer head plate 4, and an enlarged central bearing e through the inner head plate 5, both concentric with the shaft bearing axis.

To facilitate assembly of the unit, the inner cylinder end plates 6 and 7 are formed separately, and are rigidly retained in place by flat circular clamp bands 8 and 9 and the respective adjacent head plates 4 and 5 bolted thereagainst. An elongated tubular arm support bearing 10 is fixedly and rigidly attached to the inner bearing casing end, preferably as a part of the cylinder head plate 7, concentric with the shaft bearing a axis, said bearing being projected out through the enlarged casing end bearing e. It is pointed out that this bearing control casing, when assembled, then becomes a complete rigid bearing support, as illustrated in the Fig. 3A. A drive shaft 11 is rotatably mounted through the casing bearing sections a, d, and 10. A drive gear 12 is fixedly mounted on the shaft 11, positioned within the casing outer end recess b, and a driven gear 13, of equal diameter, is rotatably mounted over the extended tubular bearing 10, positioned within the opposite casing end recess c, both gears 12 and 13 being connected by the double back gears 14 fixedly mounted on the stub shaft 16 which is rotably mounted through the casing wall, thus transmitting the drive shaft rotations directly to the inner driven gear 13. (However, in some unit structures, the back-gearing may be omited if desired.) The gear 13 is formed with an extended sleeve hub f, integral therewith, designed for rotably mounting over the tubular bearing 10, also fitting rotatably within the enlarged casing bearing e, and carries a spur gear 17, of equal diameter, fixedly mounted thereon. Within each of the dual hydraulic cylinders 2 and 3 are slidably mounted hydraulic pistons 18 and 19 respectively, each piston slidably mounted over the drive shaft 11, and designed for attaching operating mechanism thereto, and all with fluid pressuretight joints throughout. The hydraulic pistons 18 and 19 are operated by pressure fluid from the various pressure (preferably plunger) units W, X, Y, and Z through the connecting inlet pressure pipes 21, 22, 23, and 24, opening into their respective cylinder ends through wall ports g. Each pressure unit being operated by one of the automobile control pedals, or the engine governor or at will of the operator. When the accelerator pedal x is depressed, the pressure unit X operates through the connecting pipe 21, displacing the hydraulic piston 19 to close the control unit port valve 38 of the drive unit C, over the port 37.

The reverse pedal y, when depressed, operates through the pressure unit Y and connecting pipe 22, for reversing the direction of the piston 19, for closing the reverse unit D outlet port 37, also for closing the reverse drive gears 17 and 55, and at the same time open the drive unit port, as only one of the operating units C or D operates at a time.

The brake pedal z, when depressed for operating the regular wheel brakes, also may operate the plunger pressure unit Z through the connecting pipe 20 opening into the inlet pipe 21 through the special control fly-valve 59, also for displacing the hydraulic piston 19 and the unit C port valve 38 for continued connection with the engine crank shaft, as the forward driving position, thus utilizing the engine cylinder back-pressure as an added auxiliary brake means, and when the automobile is coasting down hill, if not too steep, the pipe fly valve 59 may be closed by depressing a special auto dash button 62, and continuing the engine back-pressure as a brake means. The fly valve 59 is automatically released when fluid pressure is again forced through either pipe 20 or 21 by any pressure instrument operation.

The engine governor control W illustrated as of external type comprises a uniform fluid pressure chamber, connected to opposite ends of the hydraulic cylinder 2, by the pressure pipes 23 and 24, the unit is illustrated with a standard ball governor unit thereon, and connected to alternate the respective pipe inlet valves, as indicated in Fig. 3, and with the lower ball position, indicated, connected with the pipe 23 intake for displacing the hydraulic piston 18, as in the case of an overloaded engine, slowing down, and likewise displacing a special fluid release valve 61 by the connected shaft slides 60, thus again allowing, temporarily, a partial fluid flow, and decreased drive unit rotations, until power recovery is made, and the governor speed readjustment on the unit valve for normal closed operation. An internal port governor may also be used, if desired.

The rotatable fluid drive section B comprises a fluid filled, cylindrical casing 27, closed at both ends by the fixedly attached head plates 28 and 29, provided with a central bearing h and i respectively, both bearings being concentric with the casing axis, designed for rotatably mounting the casing over the drive shaft 11 and the support control bearing 10, as shown in the Fig. 3. The head plate bearing h is designed to enter within the bearing recess j formed within the control unit head 5, designed for forming a fluid pressure tight joint therewith, and the drive casing B is retained in closed contact position within the bearing control recess, on the shaft 11 by means of an intervening lock collar 30 as mounted between the casing head and the fixedly mounted drive gear 17. The opposite head plate bearing i is designed to also receive a driven shaft 31 fixedly mounted therein, both rotatable as a solid unit.

Within the cylindrical drive casing 27 are mounted dual, drive and reverse, fluid control units C and D, arranged back to back, and centrally positioned therein. Each control unit comprises a series of flat, spur, idler gears 32, uniformly arranged about center drive gears 33 and 33a respectively, all rotatably mounted within a surface fitting, pressuretight, gear casing 34 and 34a, and with their central drive gears 33 and 33a operatively mounted over the drive shaft 11. Each gear casing 34 is formed with dual, outlet, and return, chambers E and F, formed on the casing outer side wall, concentric with the drive shaft axis, and each is provided with inlet ports 35 and outlet ports 36 leading through the intervening casing walls, opening directly into the gear chamber recesses G and H, at the respective gear teeth intersections, and as illustrated in the Figs. 4 and 5. The central drive gear 33, of the fluid drive drive unit C, is fixedly mounted on the drive shaft 11 and rotates therewith, while the central drive gear 33a, of the reverse control unit D, is rotatably mounted over the said drive shaft, and is operative only when connected to the adjacent reverse gear mechanism. Any number of idler gears 32, may be used, as desired, as illustrated in Fig. 4, and outlined by the dotted lines. Only one control unit operates at a time. The fluid control units above described are the internal flow type and are more specifically described and claimed in my former patent previously mentioned, although the respective units are again used as an element within this new structural combination.

The control unit outlet ports 36, in each case, open directly into the dual outlet chamber E, and the fluid flowing therefrom passes through the casing port 37, when open, directly into the adjacent chamber F, thence back through the recirculating channel port 35, into the fluid control inlet chamber G, for recirculation through the respective unit gears when rotated. The outlet ports 37 are controlled by special tubular port valves 38 slidably mounted over the drive shaft 11, and is displaced thereon for closing, or regulating, the ports 37 by movement of a connected shaft slide bars 39 splined lengthwise along the drive shaft through the special shaft grooves k, and are connected to the tubular valve hubs by fixed engaging ribs l and m formed thereon and as an integral part of the slide bars, as shown in Fig. 3B, allowing free rotation of both shaft and slides, within the valve hub shaft bearings. (The shaft slides 39 may also be fixedly attached to the hub wall, if so desired.) Each valve shaft slide bar 39 is extended through a shaft groove k, to a position within the hydraulic bearing control piston chamber 3, and likewise engaged to the piston 19 shaft bearing by similar fixed end slide ribs l and m, and operated thereby as said piston is displaced by fluid pressure through the control pipes 21 and 22 as previously described. The valve 38, during operations, prevents any pressure fluid escaping back to the outer chamber J, thus preventing any energy loss. The valve 38 is also formed with an extended external operating collar 40, designed for engaging and displacing an adjacent intake valve operating rod 41 as the valve 38 is being closed, or regulated over the port 37. An alternate valve structure is illustrated in Fig. 7, designed for special valve control, both being specifically described in my prior patent application Serial No. 147,975.

Any rotation of the drive shaft 11 and connected gears, will draw the fluid from the outer casing chamber J into the control unit C through the wall inlet port 42, if open, and flow with the open gear teeth, and out of ports 36 and 37 into the return chamber F back through the recirculation channel ports 35 again into the gears for recirculation, but without rotation of the drive casing 27 and connected driven shaft 31 during the free gear rotations. As the valve 38 is being displaced over the ports 37, the fluid flow and the gear rotation is retarded accordingly, thus forcing the drive casing 27 to start rotation and which increases in inverse ratio with the decreasing fluid flow as the port is closed. However, when the port 37 is fully closed, the unit gears are locked by fluid back-pressure, and the casing 27 and the connected shaft 31 are forced to rotate directly with the engine drive shaft 11, with no fluid heating, or energy loss.

Both control unit casings are formed with external fluid inlet ports 42, and with internal recirculation channel ports 35 positioned adjacent thereto within the gear teeth intake chambers G. The fluid flow therethrough is controlled by a dual valve mechanism specifically detailed in Figs. 8 to 13 of the drawings. The purpose of the dual valve structure is to open both valve ports simultaneously, but only temporarily for the external port 42, for instant refilling of the unit gear chambers, then close again to prevent any fluid or energy loss, by pressure fluid return to the outer chamber J. The internal port 35 remaining open after the closing of the external port 42, and during continued operations, resulting in full internal fluid recirculation, without energy loss.

The dual valve as shown is illustrative of any suitable type of valve as may be applied thereto for various specific unit requirements, and is more specifically described in my prior patent application Serial No. 175,399.

The valve structure comprises dual valve plates 43 and 44 positioned one within the other, and pivotally mounted on the control unit casing outer wall adjacent the external fluid intake port 42, by the fixed pivot pin 15. The inner valve plate 43 is formed with a pivot hub 45 at the lower end and with a side valve plate n projected from the upper end thereof positioned to engage and close the adjacent internal port 35, when closed. The outer valve plate 44 is formed of flat sheet metal with an inner flanged edge o, designed to receive the inner valve plate 43 therein and for closing over the external port 42. The valve plate 44 is rotatably mounted over the inner valve hub 45. The inner valve plate 43 is provided with a spring arm ratchet 46 pivotally mounted thereon, designed to engage the outer valve plate recess p when both valves are fully closed. Both valves are opened simultaneously by movement of the attached operating arm 25 keyed to the hub 45, and is propelled by the operating rod 41 engaging the valve operating flange 40, and until the said ratchet arm 46 contacts the opposite port wall, as shown in the Fig. 9, thus releasing the ratchet 46 from the outer plate recess p, allowing the outer valve 44 to close over the external port 42 by reaction of the attached spring 47, as the inner valve 43 is restrained in its open position, thus providing complete internal fluid recirculation within the unit C, without loss of pressure fluid, or energy, and preventing fluid entrance or discharge from the external port 42. The inner valve 43 is closed within the outer valve 44 by the reaction of the internal stressed spring 26 when the operating pressure on the rod 41 is released, thus closing and sealing both ports 42 and 35, when inoperative, or when idling, preventing any fluid entering the gear chambers. No fluid being in the idling gears prevents any fluid heating.

For special types of driving units, for heavy loads, the dual valves 43 and 44 may be locked in their closed positions, to prevent leakage or reopening, by special dual hub ratchet 48, as illustrated in the Fig. 13, the ratchet remaining locked until the operating arm 25 is slightly displaced as allowed by the enlarged key recess $q$, allowing arm cam $r$ to raise said ratchet before rotation contact is made. The dual ratchet 48 is automatically closed by the contact spring 49 when both dual valve sections are in closed positions.

By utilizing the dual spring valve both ports are opened in unison, temporarily, for instant fluid refilling, and then automatically reclosing the outer port. The drive shaft power being transmitted through fluid pressure only, the closing of the valve 44 prevents any fluid release into the outer chamber J, therefore prevents loss of pressure energy during power operation as the fluid under pressure is by-passed around the gear teeth continuing at full pressure throughout the entire recirculation, and with no energy loss. As "power" equals "torque" times the "rotations," therefore, (with no loss of energy), a decrease of "rotation" will result in an increase of "torque," or the old torque multiplication the same as in the old gear transmission now in common automobile use.

The adjacent reverse control unit D is similarly constructed and operated, but with the central drive gear 32a rotatably mounted on the drive shaft 11, said gear being designed with an extended tubular hub $s$ projected outside the casing and into an adjoining reverse gear assembly I, and carries a drive gear 50 fixedly mounted on the outer end thereof. The unit gear, and valve, operations are exactly the same as described for the drive control unit C. However, both the valve 44 and operating rods 41 may be omitted on the reverse unit D, if desired, as the reverse control unit gears remain idle except when actually connected by the reverse pedal $y$ operation, as only one control unit operates at a time.

The reverse gear assembly I is mounted on the extended tubular fixed bearing 10, by the rigid support arms 51 fixedly attached thereto, positioned radially thereon adjacent the extended reverse drive gear 50 of the reverse unit D. Two idler gears 52 are rotatably mounted on the radial support arms 51, positioned to mesh with the reverse drive gear 50. An enlarged internal drive gear 53 is rotatably mounted over the fixed tubular bearing 10, adjacent the support arms 51, and engage and rotate the idler gears 52 and connected drive gear 50. The internal gear 53 is retained in rotatable position by a fixed bearing collar 54 mounted on the supporting bearing 10. A circular, closed, operating casing K designed to inclose the reverse gear assembly I, preferably formed with a rim groove $w$ for engaging a ball latch 58, is rotatably mounted over the supporting bearings $s$ and 10, adjustable in both directions thereon. The casing K is formed with an extended side gear 55 concentric therewith and positioned inside the adjacent dual bearing control back-gear 17, and is designed for enclosing and engaging operatively therewith by sidewise frame displacement, when operated. Both gear engaging teeth ends are preferably sharpened to facilitate engagement. The inner casing wall is provided with ratchet gear teeth $t$, formed or mounted thereon, for engaging a counter ratchet gear $u$ formed on the internal gear 53 hub, when said frame is displaced thereagainst, for driving the reverse gearing and connected reverse fluid control unit D, and thereby reverse rotations of the connected drive casing 27 and connected driven shaft. The opposite casing wall is formed with a concentric, circular operating boss 56, designed for engaging and displacing the valve operating rod 41 and closing the unit fluid inlet port valve, as in the former case. Suitable recess operating bars 57 are slidably mounted through channels $v$ formed through the fixed tubular bearing 10, designed for engaging, rotatably, the casing K wall bearing edge, also the hydraulic piston 19, operative for frame, and valve, and gear displacement, by the liquid pressure on said piston applied through the respective pressure pipes 22, when the reverse pedal plunger Y is operated. The counter ratchet gear $u$ may also be attached to the internal gear hub by adjustable spring means, if desired, as disclosed in my former patent.

When both outlet valves 38 stand unrestrained in their neutral, idling position, as in Fig. 3, all outlet ports 37 are open, and all inlet ports 35 and 42 are closed, and any gear rotation, idling, of either unit operation, the remaining unit internal fluid pressure will slightly depress valve 38 and escape back into the outer casing chamber J due to the closing of the inlet valves, said outlet valves 38 being returned to their neutral closed positions by reaction of the neutral spring latch ball 58 within the casing groove $w$, thus providing free, idling gear rotation within empty control gear chambers, and again with no fluid flow, or fluid heating, or energy loss.

When the operating valve 38 is closed over the port 37 for direct operation, the respective operative fluid control unit gears are locked by fluid back-pressure, and the drive casing 27 is forced to rotate directly with the shaft 11, or in reverse. There being no fluid internal flow, therefore no fluid heating, or loss of power pressure energy.

And during the starting operation as the valve 38 is moved over the port 37, the resulting fluid flow is retarded, likewise the unit gear rotations, in the inverse ratio to the resulting fluid flow; and as the inlet port 42 is closed, except for an instant, the internal fluid flow, under pressure, is by-passed around the gear teeth continuing at full power pressure throughout the entire recirculation (no return or release to outer fluid casing), therefore no loss of fluid, or fluid power energy, but with full torque multiplication the same as with the old gear transmission now commonly used.

When coasting down hill, before the accelerator pedal $x$ is released, an auto dash button 62 may be depressed by the operator, thus locking the hydraulic piston 19 in its power position through the connecting fly-valve 59 and thus continuing the drive shaft connection and utilizing the engine back-pressure as an auxiliary brake unit, but which is automatically released as either the accelerator pedal $x$, or the brake pedal $z$ is again depressed, by the forward fluid flow through the valve 59 actuated by their respective pressure units X or Z. The same operation applies to the brake pedal $z$, also.

It is pointed out that all previous fluid drive, or clutch units are based upon external fluid flow, coming from the outer fluid casing directly into the operating gears, and back into the outer drive casing chamber again, resulting in a continuous fluid flow and a continuous release of power energy, thus producing excessive fluid heating, a great loss of energy, and without full torque multiplication for the driven unit.

Having fully described my hydraulic fluid drive and control what I claim as my invention and desire to secure by Letters Patent is:

1. A hydraulic automatic drive control for transmitting power from one rotatable unit to another and controlling the direction and speed of the driven unit, and used therewith, comprising a fixedly mounted hydraulic bearing control and a cylindrical fluid drive rotatably mounted thereto within a sealed casing end bearing, both being united by a common drive shaft rotatably mounted therethrough and intervening operating mechanism common to both sections, the said bearing control section being formed of a chambered casing designed with central bearing therethrough and having dual hydraulic cylinders positioned concentric with the bearing axis, said common drive shaft being mounted through said bearing, power pistons slidably mounted within said hydraulic cylinders and operatively mounted over said drive shaft and slidable thereon, hydraulic pressure means connected to said hydraulic cylinders for operating and controlling said piston movements, shaft driven back-gearing rotatably mounted within said bearing control casing and extended through the casing sealed end bearing and within the fluid drive unit providing reverse power mechanism for said fluid drive, said fluid drive comprising a closed, fluid filled, cylindrical casing formed with end drive shaft bearings for rotatably mounting over the drive shaft, a driven shaft fixedly mounted to the outer casing end, said casing being designed with dual, gear drive and reverse fluid control units centrally positioned, back to back, therein, and operatively connected with the drive shaft and extended reverse power mechanism, operating mechanism for connecting and controlling each of said fluid control units for their respective drive shaft and back-gearing operations, actuated by said connected bearing control hydraulic pistons and connected drive shaft mechanism.

2. A hydraulic automatic drive control for transmitting power from a drive shaft to a driven shaft and controlling the direction of rotation and speed of the driven shaft, and used therewith, comprising a fixedly mounted shaft hydraulic bearing control unit and a fluid drive rotatably mounted therewith within a sealed casing end bearing, and united by a common drive shaft rotatably mounted therethrough and intervening operating mechanism common to both sections, said bearing control being formed of a chambered casing with central shaft bearing therethrough, and designed with a hydraulic pressure cylinder positioned concentric with said shaft bearing axis, the drive shaft rotatably mounted through said shaft bearing, a power piston slidably mounted within said cylinder and operatively mounted over said drive shaft, hydraulic pressure means connected to said cylinder for operating and controlling the piston movements, slidably mounted operating slides connected with said piston, said slides being extended outside the casing wall, shaft driven back-gearing rotatably mounted within the casing and extended operatively through the casing end sealed bearing and within the fluid drive casing, said fluid drive comprising a closed, fluid filled cylindrical casing formed with central end shaft bearings for rotatably mounting the drive shaft therethrough, and designed with dual, gear drive and reverse, valve operated, fluid control units, positioned centrally therein, back to back, and operatively mounted on said drive shaft, operating mechanism mounted within the casing for connecting and controlling each fluid control unit for drive shaft connections and operations, actuated by the connected bearing control hydraulic piston operations and connected drive shaft back-gearing mechanism.

3. A hydraulic automatic drive control for transmitting power from one rotatable unit to another and controlling the direction of rotation and speed of the driven unit, and used therewith, comprising a fixedly mounted shaft bearing control unit and a cylindrical fluid drive rotatably mounted therewith, over and within an extended sealed bearing casing end bearing, and united by a common drive shaft rotatably mounted therethrough and by intervening operating mechanism common to both sections, said bearing control being formed of a chambered bearing casing with a central shaft bearing therethrough and designed with dual hydraulic pressure cylinders positioned concentric with the shaft bearing axis, the drive shaft being rotatably mounted therethrough, power pistons slidably mounted within said dual hydraulic cylinders and mounted operatively over said drive shaft, splined operating shaft bars slidably mounted within the drive shaft for rotatably engaging said piston bearings, hydraulic pressure means connected to said cylinder ends and opening therein for operating and controlling the piston movements, shaft driven back-gearing rotatably mounted within said bearing control casing and extended operatively through the casing sealed end bearing, and within the fluid drive casing chamber, said fluid drive comprising a fluid filled, cylindrical casing closed at both ends and formed with central shaft bearings for rotatably mounting the drive shaft therethrough and for mounting within the sealed control casing bearing, said casing having a driven shaft section fixedly mounted to one end thereof, the fluid drive casing being designed with dual, internal fluid flow, gear drive and reverse fluid control units, positioned centrally back to back, therein, said control units being valve operated and provided with fluid release and internal flow dual regulating valves therein, and are operatively connected with the drive shaft, the drive control unit being fixedly mounted on said shaft and the reverse control unit gear rotatably mounted thereover, and is provided with reverse gear mechanism, operative mechanism movably mounted over the shaft for operating and controlling each fluid control unit drive shaft operation, actuated by the connected hydraulic pistons with shaft operating bars and connected drive shaft back-gearing operative through said reverse gear mechanism.

4. A hydraulic automatic drive and control for transmitting power from one rotatable unit to another and controlling the direction of rotation and speed of the driven unit, and used therewith, comprising a fixed hydraulic bearing control unit and a rotatable fluid drive rotatably mounted therewith over and within an extended sealed casing end bearing, and united by a common drive shaft rotatably mounted therethrough and by intervening operating mechanism common to both sections, the bearing control unit being formed of a chambered bearing casing with a central shaft bearing therethrough and designed with dual hydraulic cylinder chambers positioned concentric with the bearing axis, the drive shaft being rotatably mounted therethough, power pistons slidably mounted within the hydraulic chambers and operatively mounted over the drive shaft, splined shaft operating bars slidably mounted along the drive shaft for rotatably engaging the respective piston bearings operatively, operating bars slidably mounted through the extended shaft bearing also operatively connected to one of said power pistons, all operating bars being extended to within the fluid drive casing, hydraulic pressure means connected to each hydraulic cylinder end through intervening inlet ports, for operating and controlling the respective piston movements, shaft driven back-gearing rotatably mounted within the bearing control casing and extended through the casing end sealed bearing and within the fluid drive unit, said fluid drive unit comprising a closed, fluid filled, cylindrical casing formed with centrally positioned end shaft bearings therein, for rotatably mounting said drive shaft therethrough, said casing having a driven shaft section fixedly mounted to the outer end thereof, and is designed with dual, valve operated, internal fluid flow, gear drive and reverse fluid control units formed with fluid release and internal flow dual regulating valves therein, said control units being centrally positioned, back to back, therein and each operatively mounted on the drive shaft, the drive control unit gear being fixedly attached to said drive shaft, and the reverse control unit gear rotatably mounted thereon and provided with an extended external drive gear, reverse gear mechanism mounted operatively over said drive shaft positioned adjacent the reverse fluid control unit and operatively connected therewith, operating mechanism mounted within said casing surrounding the drive shaft designed for operating the respective fluid control units for independent drive shaft operations, all actuated by said connected bearing control hydraulic piston shaft operating slides and connected drive shaft back-gearing and operating mechanism.

5. A rotatable fluid drive and control adapted for transmitting power and speed control from one rotatable unit to another, and used therewith, comprising a rotatable, closed, fluid filled, cylindrical drive casing formed with central end bearings concentric with the casing axis, a drive shaft rotatably mounted through said end bearings and a driven shaft section fixedly mounted on the outer casing end, dual, valve operated, gear drive and reverse fluid control units, fixedly mounted, back to back, centrally within said casing concentric with said drive shaft and operatively mounted thereon, the drive control unit drive gear being fixedly attached to the drive shaft and the reverse control unit gear rotatably mounted thereover, reverse gear mechanism operatively mounted over said drive shaft adjacent the reverse fluid control unit designed for operatively connecting thereto, back-gearing mounted over said drive shaft, connected operatively therewith and projected within the casing through the end bearing, engageable with said reverse gearing, means for connecting said reverse gearing and control unit operatively with the drive shaft for reversing the rotation of the driven shaft, and means for connecting said drive fluid control unit directly with the drive shaft for rotating said connected driven shaft directly therewith.

6. A rotatable fluid drive and reverse unit for transmitting power from one rotatable unit to another and used therewith, comprising a rotatable, closed, fluid filled, cylindrical drive casing formed with central end bearings concentric with the casing bearing axis, a drive shaft rotatably mounted through the casing bearings, a driven shaft section fixedly attaching to the casing outer end, dual, valve operated, gear drive and reverse internal flow fluid control units, fixedly mounted, back to back, centrally within the casing concentric with the drive shaft, both control unit drive gears being operatively mounted on said drive shaft, the drive control unit gear being fixedly attached to the shaft and the reverse control unit rotatably mounted thereover, control unit release and internal flow dual regulating valves mounted within said unit internal flow ports and passage, slide operating means for regulating said valves, reverse gear mechanism mounted operatively over said drive shaft adjacent the reverse control unit designed for operatively connecting therewith, back-gearing operatively mounted over said shaft, connected directly therewith and projected within the casing end bearing, engageable with said reverse gearing, shaft slide operative means for connecting said reverse gearing and valve operated reverse control unit mechanism, operatively to the rotatable back-gearing and drive shaft for reversing the driven shaft rotations, and shaft slide operative means for connecting valve operated drive control unit mechanism with said drive shaft for rotating said driven shaft directly therewith and for regulating and controlling the speed of said driven shaft.

7. A hydraulic bearing control for operating and controlling connected rotatable power units, and used therewith, comprising a fixed, fluid filled chambered bearing casing provided with a shaft bearing lengthwise therethrough and formed with a tubular extension bearing projected from one casing end, a drive shaft rotatably mounted through said bearing, dual hydraulic piston chambers formed within the casing concentric with the drive shaft, hydraulic power pistons slidably mounted within said chambers, both slidable over said shaft and operatively mounted thereon, operating slide bars splined along the drive shaft and connected rotatably with the respective hydraulic power pistons, said slide bars being extended outside the casing bearing end wall, attachable to external operative mechanism, operating slide bars slidably mounted through said extension casing bearing also connected to one of said pistons and extended to outside of bearing end and attachable to exterior operative mechanism, shaft back-gearing rotatably mounted within the casing end chambers concentric with the shaft and operatively connected thereto positioned with the driven gear projected out through the casing end bearing for receiving an external drive gear thereon for engaging and operating connected external mechanism, and means for injecting fluid under pressure within the respective hydraulic cylinder ends for controlling and operating said piston displacements and connected operating mechanism.

8. A hydraulic bearing control for operating and controlling connected rotatable power mechanism, and used therewith, comprising a fixed, chambered, fluid filled bearing casing provided with a shaft bearing lengthwise therethrough and formed with a tubular, internal and external, extension bearing projected from one casing end, a drive shaft rotatably mounted through said casing bearing and bearing extension, dual hydraulic piston cylinders formed within said casing concentric with said shaft axis, a hydraulic power piston slidably mounted within each of said cylinders and slidable over said shaft and operatively mounted thereon, operating slide bars splined along said shaft and slidable therein and connected operatively with said respective power pistons, said splined operating bars being extended along the drive shaft outside the casing end bearing, operating slide bars slidably mounted through said casing tubular extension bearing and extended outside the bearing end, all extended operating bars being attachable to exterior operative mechanism for controlling same, and means for injecting hydraulic fluid pressure within the respective hydraulic cylinder ends for controlling and operating the piston displacements and connected rotatable mechanism.

9. A hydraulic bearing control for operating and controlling connected rotatable power mechanism, and used therewith, comprising a fixed, fluid filled, chambered bearing casing provided with a shaft bearing lengthwise therethrough, a drive shaft rotatably mounted through said casing bearing, a hydraulic cylindrical piston chamber formed within said casing concentric with the drive shaft axis, a hydraulic power piston slidably mounted within said cylindrical piston chamber, slidable over said shaft and operatively mounted thereon, operating slide bars splined along said shaft and slidable therein and connected operatively with the hydraulic piston, said slide bars being extended along said shaft and outside the casing end bearing and attachable to exterior operating mechanism, and means for injecting hydraulic fluid pressure within opposite hydraulic cylinder ends for controlling and operating said piston displacements and attached exterior control mechanism.

MYRON J. DIKEMAN.

REFERENCES CITED

The following references are of record in the file of this patent:

UNITED STATES PATENTS

| Number | Name | Date |
| --- | --- | --- |
| 2,165,934 | Mealey | July 11, 1939 |
| 2,213,836 | Gaddoni | Sept. 3, 1940 |
| 2,307,676 | Harlan | Jan. 5, 1943 |